Dec. 10, 1968 B. E. SEAR 3,416,142

STORAGE DIODE MEMORY DEVICE UTILIZING TUNNEL DIODE DRIVE MEANS

Filed June 1, 1964 2 Sheets-Sheet 1

NOR CIRCUIT

*INVENTOR*
BRIAN E. SEAR

BY G. Donald Weber, Jr.

*ATTORNEY*

Dec. 10, 1968 B. E. SEAR 3,416,142

STORAGE DIODE MEMORY DEVICE UTILIZING TUNNEL DIODE DRIVE MEANS

Filed June 1, 1964 2 Sheets-Sheet 2

Patented Dec. 10, 1968

3,416,142

STORAGE DIODE MEMORY DEVICE UTILIZING TUNNEL DIODE DRIVE MEANS

Brian E. Sear, Baltimore, Md., assignor to Sperry Rand Corporation, New York, N.Y., a corporation of Delaware Filed June 1, 1964, Ser. No. 371,376
12 Claims. (Cl. 340—173)

This invention relates to a memory device which utilizes storage diodes as the memory elements. In addition, tunnel diode circuitry is utilized to provide the control or drive circuitry associated with the memory device.

In the electronic art, especially in the electronic data processing machine art, there are many types of memory devices which are utilized. Such memory devices are utilized to store information during the operation of the associated circuitry. Inasmuch as the operating circuitry is extremely fast in operation, it is desirable to have memory devices which also operate rapidly. Therefore, the instant memory device was proposed. This memory device utilizes storage diodes as the memory elements and tunnel diode circuitry as the control or driving circuit. The storage diode, which exhibits extremely fast switching, stores information therein in terms of the amount of charge stored therein. The tunnel diode circuit (more particularly, the enhanced tunnel diode circuit) is an extremely rapid operating circuit which drives the memory elements and stores charge therein as required.

Additionally, the tunnel diode control circuitry is in the form of a recirculating flip-flop with control inputs. This recirculating flip-flop re-establishes or regenerates the information stored in the memory element, when necessary, and also is utilized to alter the type of information, e.g. a binary one or a binary zero, as may be desired. The binary one or binary zero is defined by a predetermined amount of charge stored in the storage diode.

It is, therefore, one object of this invention to provide a new type of memory device capable of read-write cycle times which are extremely fast.

Another object of this invention is to provide a memory device which is extremely fast in operation and which uses a novel form of memory element.

Another object of this invention is to provide a high speed memory device with a novel memory element and which is simple and inexepensive to produce.

Another object of this invention is to provide a memory device wherein individual memory cells exhibit inherent gain thereby providing large read signals.

Another object of this invention is to provide a logically non-destructive readout circuit for a memory device.

These and other objects and advantages of this invention will become more readily apparent subsequent to the reading of the following description in conjunction with the accompanying drawings, in which.

Figure 1:
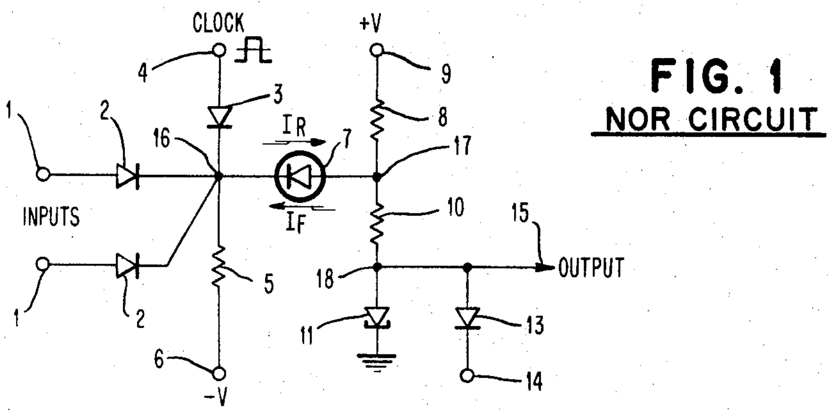
FIGURE 1 is a schematic diagram of an ETD logic circuit.

Referring now to FIGURE 1, there is shown an enhanced tunnel diode (ETD) logic circuit. The particular logic circuit shown is a NOR logic circuit. This circuit is more fully described in the copending patent application Logic Circuit, by Brian E. Sear, Ser. No. 174,829, filed on Feb. 21, 1962, now Patent No. 3,244,903 and assigned to the assignee of the instant application. Basically, the input sources 1 which may be any conventional type of input sources are connected to the anodes of diodes 2. The cathodes of diodes 2 are connected to common junction 16. The clock source 4, which may be any conventional source capable of periodically supplying signals which are positive going in polarity, is connected to the anode of diode 3. The cathode of diode 3 is connected to common junction 16. The potential source 6, which may be any conventional type of substantially constant (in this case negative) potential source, is connected to one terminal of resistor 5. Another terminal of resistor 5 is connected to common junction 16. Common junction 16 is also connected to the anode of storage diode 7. The anode of storage diode 7 is connected to common junction 17. Source 9 which may be any conventional type of substantially constant (in this case positive) potential source is connected to one terminal of resistor 8. Another terminal of resistor 8 is connected to common junction 17. One terminal of resistor 10 is connected to common junction 17. Another terminal of resistor 10 is connected to common junction 18. The anode of tunnel diode 11 is connected to common junction 18. The cathode of tunnel diode 11 is connected to suitable reference potential source for example ground to which all other potentials are referenced. Tunnel diode 11 is biased for bistable operation. Also connected to common junction 18 is the anode of reset diode 13. The cathode of reset diode 13 is connected to source 14 which may be any conventional source capable of periodically supplying negative going pulses. The output terminal 15 is connected to common junction 18.

The operation of the circuit is such that in the absence of a high level input signal at any input 1 and in the absence of a high level clock signal supplied by source 4, a forward current flow exists from source 9 to sink 6 via resistor 8, storage diode 7 and resistor 5. This forward current is effective to store charge in the lattice structure of storage diode 7 in the known manner. In the event that a high level input signal is supplied at terminal 1 or a high level clock signal was applied at terminal 4, the storage diode 7 would be reverse biased and forward current flow therethrough would not exist. In the absence of forward current through storage diode 7, no charge would be stored therein.

In the event that charge is previously stored in storage diode 7, a high level clock signal supplied by source 4 will pass from source 4 through diode 3 (forward direction), through storage diode 7 (reverse direction), through resistor 10 and through tunnel diode 11 (forward direction) to ground. The forward current in tunnel diode 11 is sufficient to switch tunnel diode 11 from its normally low level biased condition (low voltage) to its high level biased condition (high voltage). The condition of tunnel diode 11 provides the output of the circuit which output is detected at output terminal 15.

On the other hand, a negative going signal supplied by source 14 causes current to flow through rectifier diode 13 (forward direction) such that the tunnel diode 11 is switched from the high voltage operating condition to the low voltage operating condition. It is clear of course, that the signal supplied by clock source 4 and reset source 14 occur at different times. If no charge was previously stored in diode 7, the set clock signal applied by source 4 reverse biases the diode and passes to sinks via diode 3 and resistor 5. However, it will be seen that in the presence of a high level input signal at any source 1, a low level output signal is produced. On the contrary, with the application of a low level input signal at source 1, a high level signal is produced at output 15.

The same circuit comprises gates 20 and 22 shown in

Figure 2:
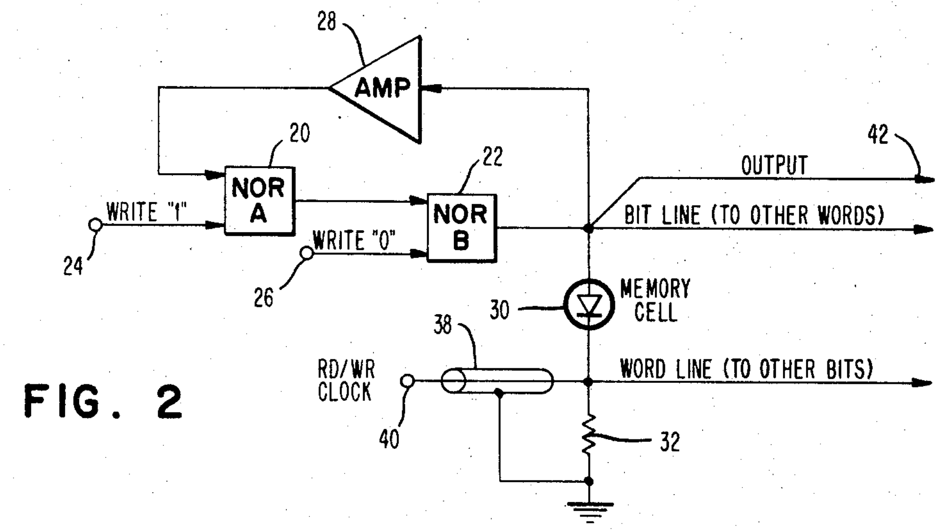
FIGURE 2 is a schematic diagram of a single memory cell with the control or driving circuitry attached thereto.

FIGURE 2. Thus, source 24, which may be any conventional source which selectively supplies pulses, comprises one of the input sources which is connected via diode 2. The ouput of NOR A gate 20 is similar to output terminal 15 shown in FIGURE 1. The output of the gate 20 is connected to one input of gate 22. Another input to gate 22 is supplied from source 26 which may be any conventional source which selectively supplies input signals, connected to gates 22 via the appropriate diode 2 (see FIGURE 1). The output of gate 22 is connected to the amplifier 28 and is fed back to another input of gate 20. Amplifier 28 is utilized in some applications where the output signal from gate 22 is sufficiently attenuated to be ineffective in operating gate 20. Where this attenuation does not take place, the amplifier 28 may be omitted. In addition, it may be desirable to utilize a rectifier diode between the output of gate 22 and the input to amplifier 28 in some applications. However, inasmuch as this modification is not absolutely required, this diode is not shown.

The output of gate 22 is also connected to the anode of storage diode 30. The cathode of storage diode 30 is connected to the read-write clock source 40 via transmission line 38 one conductor of which is grounded. Impedance 32 represents the lumped impedance of the appropriate word and bit lines and the terminating impedance of the read-write clock line. Storage diode 30 represents a memory cell of the memory device. The bit line 34 is connected to the anodes of other storage diode memory cells in other word groups. Likewise, word line 36 is connected to the cathodes of other storage diode memory cells in other bit groups. Such further interconnections are shown in the matrix array of FIGURE 4.

Figure 3:
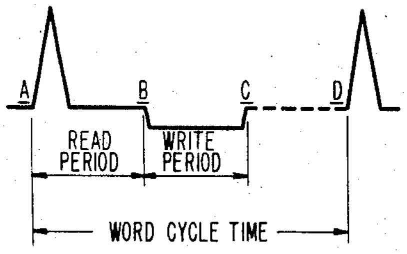
FIGURE 3 is a graphic diagram of the read-write signal which is applied to the circuit shown in FIGURE 2.

Referring now to FIGURE 3, there is shown a graphic diagram of the read-write clock signal. This clock signal comprises a read period between A and B. During this period a positive going pulse of relatively large magnitude (shown as a spike-like pulse) is applied. The write period extends between B and C. During this period a negative going pulse of relatively small magnitude, but longer duration, is applied. The complete word cycle time extends from A to D. The actual signal period extends from A to C. The period C–D comprises a flexible time period the duration of which may be zero (i.e., C and D coincide) to a sufficiently long time to incorporate *n* times the signal period to accommodate the seriatum sensing of *n* word lines in the memory device. That is, since the word lines are pulsed sequentially, the extent of the duration of time period C–D is *n* times the cycle time A–C. This will be more fully explained in conjunction with FIGURES 4 and 5. Moreover, the period C–D may be extended in order to provide for random access pulsing (and regeneration) of the memory array. This phenomenon will also be more fully described infra.

The read-write signal shown in FIGURE 3 is applied to terminal 40 of the transmission line 38 and, thence to word line 36. Selective control signals which indicate a write "one" or write "zero" are selectively applied to terminals 24 or 26 respectively. In describing the operation of the circuit shown in FIGURE 2, it is initially assumed that charge has been stored in the memory cell or storage diode 30 prior to the application of the read-write signal at terminal 40. The read pulse at A is sufficiently large and properly poled such that the charge stored in diode 30 is driven therefrom in the reverse direction to the tunnel diode in the NOR B circuit 22. This reverse current through diode 30 is a forward current through the tunnel diode such that the tunnel diode is switched to the high voltage state. The condition of the tunnel diode represents information which is available during the period A–C in the form of output current from the tunnel diode. This output current can also be utilized to drive external logic circuits (not shown) and the feedback loop which includes amplifier 28 and is applied to one input of the NOR A circuit 20. The NOR A circuit 20 in response to the application of a high level input signal via amplifier 28 produces a low level output signal which is applied as one input to NOR B circuit 22. In the absence of a write "zero" signal being applied at terminal 26, NOR B circuit 22 continues to produce a high level output signal. This high level output signal independently tends to forward bias storage diode 30 but in the low conduction condition. In addition, at time B, the low level write period signal is applied to word line 36 via terminal 40. Independently, this write signal is also of sufficient magnitude and of proper polarity and duration to bias storage diode 30 in the relatively low conduction state but rather near to the knee of the curve. Therefore, a write signal, when applied in conjunction with a high level output signal from the NOR B circuit 22, sufficiently forward biases storage diode 30 into the high conduction state that charge is stored therein. In the alternative, if the NOR B circuit 22 had, for some reason, supplied only a low level output signal, storage diode 30 would have remained in the low level conduction state and, therefore, stored little or no charge therein. It will be seen that the NOR B circuit 22 will produce a low level output signal whenever a write "zero" signal is applied at terminal 26 as an input to the NOR B circuit 22 or when no charge (current flow) is applied to the tunnel diode thereof during a read pulse signal. Thus, in order to store a "zero" bit in the memory cell 30, either a zero must have been stored therein previously or, in the alternative, a write "zero" signal must be applied at terminal 26. It is, therefore, readily apparent that, in the absence of a selective write signal at either of terminals 24 or 26, the information which has been stored in the storage cell 30 is automatically rewritten therein in response to a read-write signal being applied at terminal 40 and word line 36.

This automatic rewriting of information into the memory cell provides both a non-destructive readout as well as a refurbishing of the amount of charge stored in the memory cell during the memory device operation. Such refurbishing may be necessary in the case of a large memory device inasmuch as the memory cell or storage diode 30 inherently includes a leakage path through which charge may leak thereby effectively discharging the storage diode 30. However, since the discharging rate is relatively slow, a reasonable resetting or recharging of the circuit should be sufficient to offset the relatively minor discharging problem.

Figure 4:
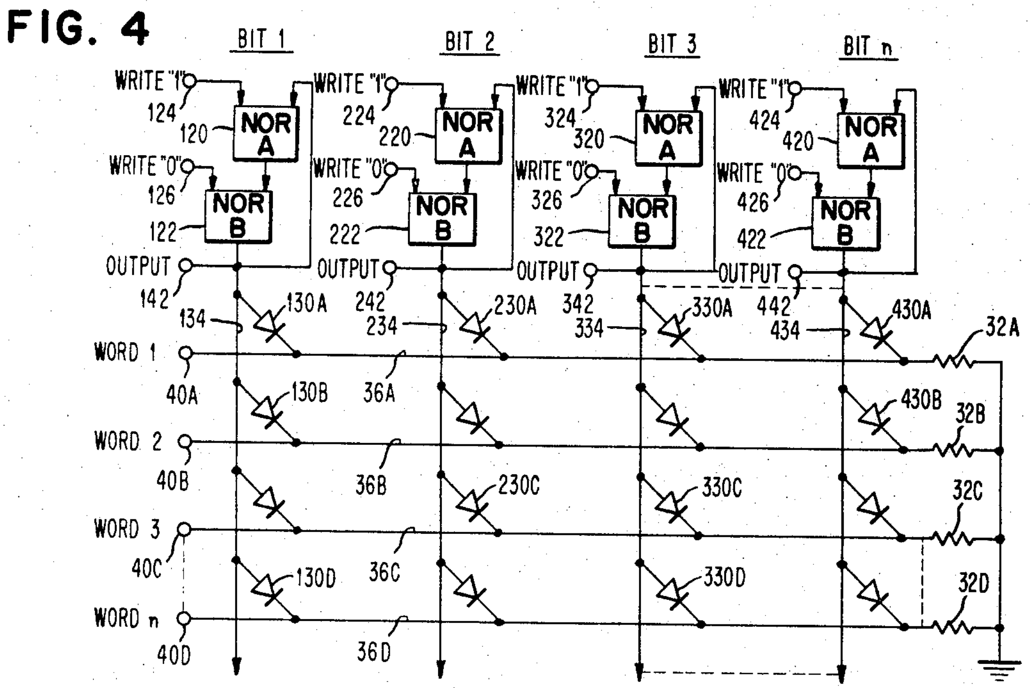
FIGURE 4 is a schematic diagram of a matrix array of memory elements and the associated control circuitry.

Referring now to FIGURE 4, there is shown a memory device which includes a plurality of memory elements arranged in a matrix array. That is, the memory elements are arranged in rows and columns. In the illustrative arrangement shown in FIGURE 4, a four-by-four matrix is shown. However, it is to be understood that the invention described is not limited to a memory device of this configuration. Furthermore, it is understood that components shown in FIGURE 4 which are similar to components shown previously bear similar reference numerals. However, in order to clearly delineate the components shown in FIGURE 4, it is necessary to insert a numeric prefix, or a letter suffix, or both to these reference numerals.

Thus, gates 120 and 122 are interconnected to form a recirculating network. The write "one" and write "zero" terminals 124 and 126 respectively are connected to these gates as shown. The output of gate 122 is connected to bit line 134. Bit line 134 is connected to the anodes of storage diodes 130A, 130B, 130C and 130D. Similarly, in the case of the bit 2, bit 3 and bit *n* columns an identical recirculating network is provided which is comprised of two NOR gates. The recirculating networks of the bit 2, bit 3 and bit *n* columns are connected to bit lines 234, 334 and 434 respectively. Each of these bit column lines is connected to the anodes of the associated storage diodes. The row word lines are connected between the read-write clock pulse sources, for example terminal 40A, and the respective terminating impedance, for example 32A, which is connected to ground. As before, the terminating impedance represents the lumped impedance of the associated lines and the required terminating or characteristic impedance of the transmission line. To each of the row lines 36A, 36B, 36C and 36D, there are connected the cathodes of the associated storage diodes. It will be seen that therefore each of the storage diodes has the cathode thereof connected to one of the row-word lines and the anode thereof connected to one of the column-bit lines. Similarly, the output terminals 142, 242, 342 and 442 are each connected to the output of the associated recirculating network or the bit line connected thereto.

Each of the memory cells thus created by the memory device arrangement shown in FIGURE 4 operates similar to the circuit shown in FIGURE 2. The operation of the circuit shown will be more fully understood by the concurrent description of the timing diagram shown in FIGURE 5. The set NOR B and reset NOR B signals are applied NOR B gates shown in the memory device of FIGURE 4. Each of the NOR B circuits receives the same set and reset signals. The frequency of the set NOR B signal (which is supplied to terminal 4 of FIGURE 1) is one-half the frequency of the reset NOR B signal. Moreover, it will be apparent that at the time when the intermediate set NOR B signal is "missing," the read signal is supplied by the read-write signal sources. This timing arrangement is necessary to permit only the read pulse which is supplied to the memory cell to provide the switching or non-switching of the output of the NOR B circuit. That is, if the read portion of the signal and the set NOR B signal were supplied concurrently, spurious signals could conceivably be produced by the NOR B circuit.

The set NOR A and reset NOR A signals which are supplied to the NOR A circuit are 180 degrees out of phase with the set NOR B and reset NOR B signals, respectively. Moreover, the set NOR A and reset NOR A signals are of the same frequency as the reset NOR B signal.

The input signals which are supplied to the NOR B (write zero) and NOR A (write one) are supplied to the appropriate input terminals, for example terminals 126 and 124 respectively. These signals are selectively applied signals which are utilized to selectively designate and, if necessary, alter the information contained in the recirculating NOR gate network. These are the signals which are used to write a different type of information into the memory cell than is already stored therein. Of course, if the input signal would be such to store information in the memory cell which is identical to the information already stored therein, no effective change will be made thereby. The output signals produced by the NOR B and NOR A circuits are signals which are typically produced by a NOR circuit in response to the input signals supplied thereto.

Figure 5:
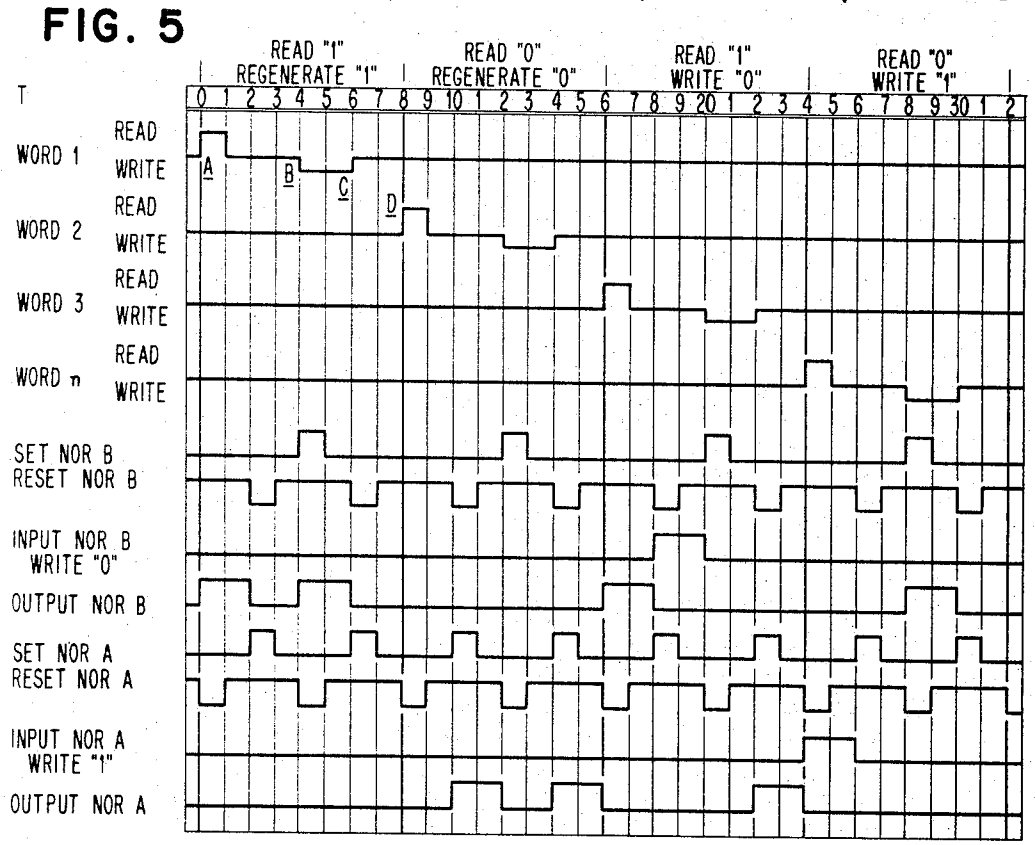
FIGURE 5 is a graphic diagram of the operation of the circuits shown in FIGURES 2 and 4.

The timing diagram of FIGURE 5 is shown in terms of four cycles of operation. In the first cycle, the signal stored in the memory cell is assumed to be a binary one. In addition, no selective input signal is applied. Therefore, the circuit performs the read one, regenerate one function. That is, the read-write signal reads a one which has been stored in the related storage diode and the recirculation network comprising NOR A and NOR B gates regenerates the one in the storage cell. Likewise, in the second cycle, the signal assumed to be stored in the memory cell is a binary zero and, again, no selective input signal is applied. Therefore, the circuit performs the function of reading a zero and regenerating a zero. In the case of the third cycle, a stored binary one is initially assumed and a selective input is supplied to the input of the NOR B circuit whereby a binary zero type of information is read into the memory cell. Thus, the circuit performs the function of read one, write zero. That is, it is assumed that a one has been previously stored in the memory cell which binary one is read and, thereafter, because of the application of the write zero to the input of the NOR B circuit, a binary zero information is written into the memory cell. The converse of this operation is shown in the fourth cycle. That is, the information read from the memory cell is a binary zero while the information written thereinto, in response to the input NOR A write one signal, is a binary one. The cycles, it will be seen, do not necessarily coincide with the timing periods of the timing chart. Rather, the cycles are shown as related to the cyclic operation of the read-write signals which are applied to the circuit. As noted supra, the time durations between switching points C and D (i.e. the trailing edge of the write signals for one word and the leading edge of the read signal for the adjacent word) may be expanded as desired. If this time period is expanded to a sufficient degree, an additional read-write signal may be inserted therein by means of appropriate logic circuitry and signal sources. This additional signal may operate as a random access signal such that a selective random access memory sampling may be effected. In addition, the random access memory signal will provide additional regeneration of the information stored in the memory. Thus, with this random access memory feature, a somewhat larger and faster memory device may be provided.

The word lines are pulsed in serial form. That is, the word 1 read-write signal is applied to terminal 40A. Subsequent to the termination of this operation, the word 2 signal is supplied to terminal 40B. The word 3 read-write signal is then applied to terminal 40C. This type of operation continues through to word *n* for which the read-write signal is applied to terminal 40D. The read-write signal which is applied to terminal 40A is applied in conjunction with the assumed condition of stored charge or a binary one being stored in the storage diode 130A. In addition, according to the first cycle of operation, no selective input signals are applied to the gates 120 or 122. Thus, the read signal portion supplied at time period T0 (suggested by leading edge A) causes reverse current flow through diode 130A to reset the tunnel diode in the NOR B circuit 122. The tunnel diode in circuit 122 is thereby set to the high voltage operating region. At the termination of the read portion of the signal at time period T1, the high level signal produced by the output of NOR B gate 122 is fed back to the input of NOR A circuit 120. Thus, NOR A circuit 120 must produce a low level output signal. Since there is no write "zero" signal applied to terminal 126, the inputs supplied to terminal gate 122 are all low level signals thereby producing a high level output signal which is again recirculated. The high level output signal produced by gate 122 is observed at the output terminal 142. At time period T2, the reset NOR B signal is supplied, for example by source 14 (see FIGURE 1). This reset NOR B signal causes the tunnel diode in the NOR B circuit 122 to be reset to the low voltage operating condition. Thus, the output NOR B signal at terminal 142 becomes a low level signal. However, at time period T4, the set NOR signal is applied for example by source 4 (see FIGURE 1) which produces a reverse current flow through storage diode 7 (see FIGURE 1) thereby setting the tunnel diode 11 in the high voltage operating region. At the same time, the write signal portion of the read-write signal (suggested by leading edge B) is also applied to the cathode of storage diode 130A. Since the output signal supplied by the NOR B circuit 122 is a high level signal which is applied to the anode of storage diode 130A and the write signal supplied to terminal 40A is a low level signal, forward current flows through storage diode 130A from the anode to the cathode thereof, thereby storing charge therein. Thus, a binary one has been read and regenerated in the memory cell comprising storage diode 130A. It should be observed, that if any of the storage diodes 230A, 330A and 430A had previously had charge stored therein, a similar operation would have occurred whereby the high level output NOR B signal would have also been observed at output terminals 242, 342 and 442.

In the case of the second cycle of operation, it is assumed that a binary zero (no stored charge) exists in the storage diode 230B. Thus, when the high level read portion of the read-write signal is supplied to terminal 40B at time period T8, storage diode 230B appears as an effective open circuit. Therefore, the high level read signal is not applied to the tunnel diode of the NOR B gate circuit 222. Since the NOR B gate circuit 222 has been reset to the low voltage operating condition, this tunnel diode remains in this condition. Therefore, the recirculated signal from the output of gate 222 to the input of NOR A circuit 220 is a low level signal. Inasmuch as the signal applied at terminal 224 is also a low level signal, gate 220 supplies a high level output signal. Since gate 220 provides a high level output signal, NOR B circuit 222 produces a low level output signal which is recirculated as described supra. In addition, the output signal observed at terminal 242 is a low level signal.

The reset NOR B signal at time period T10 merely maintains the tunnel diode of NOR B circuit 222 in the low level operating condition. The concurrent or coincident application of the write signal portion of the word 2 read-write signal and the set NOR B signal at time period T12 is ineffective to cause any change in the output of the NOR B circuit 222. That is, the high level input supplied to circuit 222 by circuit 220 causes the tunnel diode of circuit 222 to remain in the low voltage operating condition. Again, the reset NOR signal at time period T14 maintains the tunnel diode of the NOR B circuit in the low level operating condition. This low level output signal is recirculated around to the input of the NOR A circuit 220 whereupon the set NOR A and reset NOR A signals produce high level output signals from the NOR A circuit at time periods T10 through T12 and T14 through T16. The same operation is observed if charge is not stored, initially, in storage diodes 130B, 330B and 430B.

Looking now at the third cycle of operation, the word 3 read-write signal is applied to the terminal 40C. In this instance, it is assumed that a binary "one" (or charge) has been stored in the memory cell 330C. In addition, it is further assumed that it is desired to write a binary "zero" into the storage diode 330C. Therefore, an input write "zero" signal is applied as a high level signal to circuit 322 via terminal 326. Thus, the application of the read portion of the signal at time period T16 causes the switching of the tunnel diode of the NOR B circuit 322 to the high voltage operating condition. This high level signal produces a high level output at terminal 342 which is also recirculated to the input of NOR A circuit 320 whereupon the NOR A circuit produces a low level output signal. However, at time period T18, a high level input signal is applied to terminal 326 of NOR B circuit 322. This high level input signal, in conjunction with the reset NOR B signal, causes the tunnel diode of the NOR B circuit 322 to be shifted to the low level or low voltage operating condition, and be maintained in this condition such that the storage diode 7 (see FIGURE 1) of the NOR B circuit 322 is reverse biased and no charge is stored therein. Therefore, the application of the set NOR B signal at time period T20 is ineffective to switch the tunnel diode to the high voltage operating condition. Thus, the output NOR B signal remains a low level signal and is recirculated to the input of NOR A circuit 320 such that this NOR circuit produces a high level output signal which is again effective to maintain the NOR B circuit in the low level output producing condition which is again recirculated and self-sustaining. Again, it should be noted that if charge had initially been stored in any of the storage diodes 130C, 230C or 430C the binary "one" would have been read. Similarly, the application of a write "zero" signal to any of the input terminals 126, 226 or 426 again would have been effective to cause the storage of a binary "zero" in the associated storage diode. This binary "zero" is stored in the memory element diode in terms of permitting no forward current flow therethrough and, therefore, no charge storage therein.

In the fourth cycle of operation, it is assumed that when word *n* is applied to terminal 40D that the storage diode 430D has no charge stored therein whereby a binary "zero" is stored by the memory. In addition, it is assumed that it is desirable to write a binary "one" into that memory element. Thus, if a binary zero or no charge is stored in the storage diode 430D, the application of a read pulse portion of the word *n* read-write signal at time period T24 is ineffective to switch the tunnel diode of the NOR B circuit 422 to the high voltage operating region. Therefore, the output signal produced thereby and observed at terminal 442 as well as recirculated to one input of NOR A circuit 420 is a low level signal. However, at time period T24 an input signal is applied via terminal 424 to NOR A circuit 420. This signal is effective to write a binary "one" into the circuit. That is, the high level signal at terminal 424 causes NOR A circuit 420 to produce a low level output signal. This low level signal is applied to one input of NOR B circuit 422 in conjunction with a low level signal at terminal 426. Since all of the input signals to NOR B circuit 422 are low, this NOR circuit produces a high level output signal. The high level output signal of circuit 422 is observed at terminal 142 and is also applied to the anodes of the storage diodes connected to bit line 434. The application of the write signal at time period T27 to terminal 40D produces a low level signal on word line 36D whereby storage diode 430D is forward biased such that charge is stored therein. The storage of charge in storage diode 430D is equivalent to the storage of a binary "one" therein. Once again, if the operating conditions described with regard to diode 430D are applied to storage diode 130D, 230D and 330D similar operations would prevail at each of these memory cells.

In the foregoing description, there have been described the configuration and operation of a preferred embodiment of the invention. It is to be understood of course, that various modifications and changes may be made to the circuit without altering the inventive concepts thereof. For example, the storage of charge in the storage diode may be considered to be a binary "zero" instead of a binary "one" and vice versa. Likewise, the polarities of the various signals may be changed if desired. However, it should be understood that various changes may be made in the form, construction and arrangement of the parts in the foregoing description, without departing from the scope of the invention, the form hereinbefore described being merely a preferred embodiment.

The embodiments of the invention in which an exclusive property or privilege is claimed are defined as follows:

1. In combination, a recirculating network comprising a pair of NOR logic circuits, a storage diode connected to an output of said recirculating network, a source for supplying bipolar signals to said storage diode at a regular frequency, and a pair of sources for selectively supplying control signals to said NOR logic circuits.

2. The combination recited in claim 1 wherein each said NOR logic circuit comprises a tunnel diode having two distinct stable operating states, bias means connected to said tunnel diode for biasing said tunnel diode to one of said stable operating states, input means, said input means providing input signals having two distinct levels, current steering means connected between said tunnel diode and said input means, said current steering means including at least one charge storage diode, pulse supplying means connected to said current steering means for selectively providing pulses to said tunnel diode via said current steering means such that the operating state of said tunnel diode may be selectively changed, output means connected to said tunnel diode, and reset means connected to said tunnel diode.

3. In combination, a recirculating network comprising a pair of NOR logic circuits, a storage diode having a first electrode thereof connected to an output of said recirculating network, a source for supplying bipolar signals to said storage diode at a regular frequency, said source connected to another electrode of said storage diode, and a pair of sources for selectively supplying control signals to said NOR logic circuits to change the state thereof.

4. In combination, a first logic gate, a second logic gate, the output of said first logic gate connected to an input of said second logic gate, the output of said second logic gate connected to an input of said first logic gate whereby a recirculating network is provided, first source means for selectively providing control signals to an input of said first gate, second source means for selectively providing control signals to an input of said second gate, at least one storage diode, a source of bipolar clock signals, said storage diode connected between said source of bipolar clock signals and said output of said second logic gate.

5. The combination recited in claim 4 including amplifier means, said amplifier means connected between the output of said second logic gate and the input of said first logic gate.

6. In combination, a first logic gate, a second logic gate, each of said logic gates including a tunnel diode as the switching element thereof, the output of said first logic gate connected to an input of said second logic gate, the output of said second logic gate connected to an input of said first logic gate whereby a recirculating network is provided, first source means for selectively providing control signals to an input of said first gate to change the condition thereof, second source means for selectively providing control signals to an input of said second gate to change the condition thereof, at least one storage diode having two electrodes, and a source of bipolar clock signals connected to one electrode of said storage diode, said storage diode having the other electrode thereof connected to said output of said second logic gate.

7. In combination, a first plurality of logic gates, a second plurality of logic gates, the output of each gate of said first plurality of logic gates connected to an input of a different gate of said second plurality of logic gates, the output of each gate of said second plurality of logic gates connected to an input of said first logic gate which is connected thereto such that a plurality of recirculating networks are provided, a first plurality of source means for selectively providing control signals to an input of each of said first gates, a second plurality of source means for selectively providing control signals to an input of each of said second gates, a plurality of storage diodes, a plurality of sources of bipolar clock signals, at least one storage diode connected between each said source of bipolar clock signals and the output of each said second logic gate.

8. The combination recited in claim 7, wherein each of said logic gates comprises a NOR logic gate.

9. In combination, a first logic circuit comprising in combination, a tunnel diode having two distinct stable operating states, bias means connected to said tunnel diode for biasing said tunnel diode to one of said stable operating states, input means, said input means providing input signals having two distinct levels, current steering means connected between said tunnel diode and said input means, said current steering means including at least one charge storage diode, pulse supplying means connected to said current steering means for selectively providing pulses to said tunnel diode via said current steering means such that the operating state of said tunnel diode may be selectively changed, output means connected to said tunnel diode, and reset means connected to said tunnel diode; a second logic circuit comprising in combination, a tunnel diode having two distinct stable operating states, bias means connected to said tunnel diode for biasing said tunnel diode to one of said stable operating states, input means, said input means connected to said output means of said first logic circuit and providing input signals having two distinct levels, current steering means connected between said tunnel diode and said input means, said current steering means including at least one charge storage diode, pulse supplying means connected to said current steering means for selectively providing pulses to said tunnel diode via said current steering means such that the operating state of said tunnel diode may be selectively changed, output means connected to said tunnel diode, said output means of said second logic circuit connected to said input means of said first logic circuit, and reset means connected to said tunnel diode, a bipolar signal supplying source, and a further charge storage diode connected between said bipolar signal supplying source and said tunnel diode of said second logic circuit, one portion of the signal supplied by said bipolar signal supplying source causing reverse current flow through said further charge storage diode when charge is previously stored therein, the other portion of the bipolar signal tending to cause charge storage in said further charge storage diode.

10. The combination recited in claim 9 including separate input sources connected to said input means of each of said first and second logic circuits for selectively applying input signals for changing the operating state of the tunnel diodes of the associated circuit.

11. The combination recited in claim 9 wherein the reverse current flow through said further charge storage diode is applied to the tunnel diode of said second logic circuit to change the state thereof, and wherein charge is stored in said further storage diode only when the tunnel diode in said second logic circuit is in one operating state.

12. In combination, a storage diode having an anode and a cathode, a gate circuit connected to the anode of said storage diode for selectively applying high and low level signals thereto, and a bipolar signal source connected to the cathode of said storage diode for applying high and low level signals thereto at a regularly recurring rate, said storage diode having charge stored therein only when said gate applies a high level output signal simultaneously with the application of a low level signal by said bipolar signal source, said storage diode exhibiting reverse current therethrough in response to the application of a high level signal thereto by said bipolar signal source only when charge was previously stored therein, said reverse current being applied to said gate to cause the production of a high level signal thereby.

References Cited

UNITED STATES PATENTS 3,189,878 6/1965 Pricer ------------- 340—173

TERRELL W. FEARS, *Primary Examiner.*

U.S. Cl. X.R.

307—88.5